Figure 1:
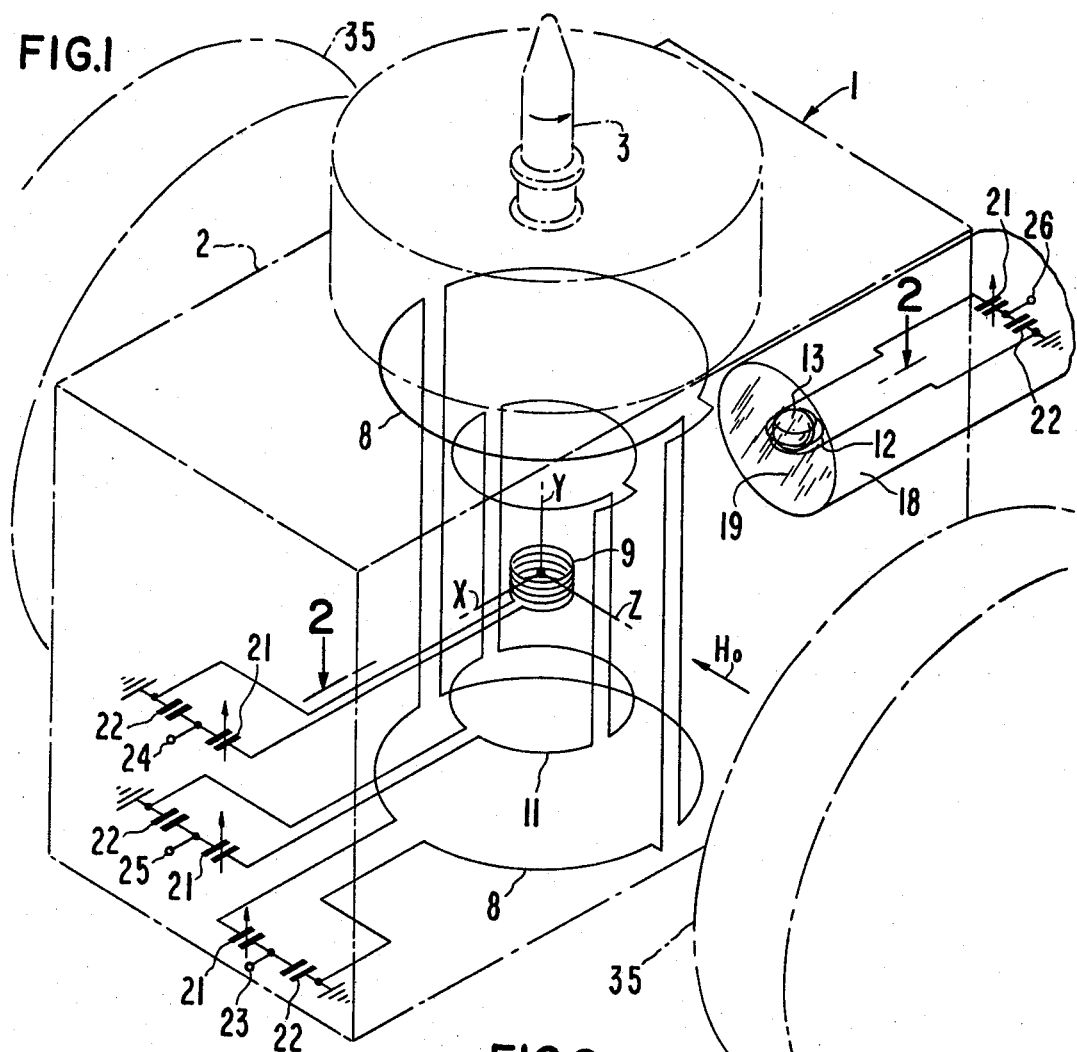

June 11, 1968

W. A. ANDERSON ET AL 3,388,322
GYROMAGNETIC RESONANCE SPECTROMETER HAVING SELECTABLE
INTERNAL AND EXTERNAL RESONANT CONTROL GROUPS

Filed Feb. 21, 1966

2 Sheets-Sheet 1

INVENTORS
FORREST A. NELSON
WESTON A. ANDERSON

BY Wm J Nolan

ATTORNEY

June 11, 1968 W. A. ANDERSON ET AL 3,388,322
GYROMAGNETIC RESONANCE SPECTROMETER HAVING SELECTABLE
INTERNAL AND EXTERNAL RESONANT CONTROL GROUPS
Filed Feb. 21, 1966 2 Sheets-Sheet 2

INVENTORS
FORREST A. NELSON
WESTON A. ANDERSON
BY
ATTORNEY

United States Patent Office 3,388,322
Patented June 11, 1968

3,388,322
GYROMAGNETIC RESONANCE SPECTROMETER HAVING SELECTABLE INTERNAL AND EXTERNAL RESONANT CONTROL GROUPS
Weston A. Anderson and Forrest A. Nelson, Palo Alto, Calif., assignors to Varian Associates, Palo Alto, Calif., a corporation of California
Filed Feb. 21, 1966, Ser. No. 529,034
10 Claims. (Cl. 324—.5)

The present invention relates in general to gyromagnetic resonance spectrometers and, more particularly, to an improved spectrometer having a control channel for automatically controlling the resonance conditions of the spectrometer through the intermediary of either an an internal or an external group of gyromagnetic bodies, either group being selectable for control, as desired without losing automatic control in a change from external to internal control. Such an improved spectrometer is especially useful for, but not limited to, observing the very weak resonance spectra of $C^{13}$ and $N^{15}$ nuclei in substances under analysis.

As used herein, "external control group" means that this group of gyramagnetic bodies, typically nuclei, is located substantially out of the same region of magnetic field occupied by the resonance monitored portion of the sample under analysis such that substantially different resonance conditions of polarizing magnetic field intensity could exist over this group as compared to the sample. As used herein, "internal control group" means that this group of gyromagnetic bodies is immersed in essentially the same polarizing magnetic field as the monitored portion of the sample under analysis. As an example, intermixed control and sample groups or a concentrically partitioned sample container with the sample group surrounded by the control group, or vice versa, or even where the two groups are in immediately adjacent regions, would all be considered as having internal control groups.

Heretofore gyromagnetic resonance spectrometers have been built to include either external control groups or internal control groups. The problem with an external control group is that the operator cannot be sure what resonance conditions of polarizing field intensity actually exist over the sample volume under analysis by what he observes from resonance of the control group. Thus, the need for an internal control group for precise calibration of observed spectra. However, the problem with an internal control group is that it is typically in the same sample cell and thus removed from the magnetic field with removal of the sample. Furthermore, the control, for precise calibration, should have as narrow a resonance line as possible, i.e., on the order of 1 Hz. When the internal control group is removed with the sample the spectrometer resonance conditions are free to drift because there is no longer a control group in the control channel. Thus each time the sample is replaced, automatic control is lost and a tedious time-consuming field-frequency search must be conducted to again find the very narrow control resonance line and to sort it out from the other possible resonance lines that may be present, some of which may be stronger than the desired control line. If a broad internal control line is used this will facilitate search but will not provide the desired degree of precision in the calibration of the spectra obtained.

In a preferred embodiment of the present invention, a gyromagnetic resonance spectrometer is provided with an internal control group and an external control group. In addition, means are provided for switching control of the resonance conditions of the spectrometer, as desired, between the two control groups. Variable field bias means is provided for bringing the resonant frequencies of the two groups into frequency coincidence such that phase lock of a common control channel is not lost in shifting control between the internal and external control groups. The resonance line width of the external control group is preferably made orders of magnitude wider than the line width of the internal control group in order to facilitate initial search for a controlling resonance line, while permitting a narrow internal control line to be used while running spectra of the samples under analysis. By use of audio field modulation to produce sideband resonance for the control channel, control group resonance is readily observed by an oscilloscope or other simple device as an audio signal in the control channel, such that proper field bias adjustments may be quickly performed.

The principal object of the present invention is the provision of a gyromagnetic spectrometer having improved automatic control of the resonance conditions whereby ease of operation of the spectrometer is facilitated.

One feature of the present invention is the provision of an internal and an external control group with means for switching operation of the control between the two groups, whereby automatic control is not lost upon removal of the sample while permitting use of an internal control for running sample spectra.

Another feature is the same as any one or more of the preceding, including means for coinciding the resonances of the two control groups.

Another feature of the present invention is the same as the preceding, including the provision of an external resonance line having a line width at least an order of magnitude wider than that of the internal control group whereby search for the control lines is facilitated.

Another feature of the present invention is the provision of audio frequency field modulation to produce sideband resonance of the control group whereby resonance of the control group is easily observed by conventional audio display devices such as A.C. meters, oscilloscopes, audio detectors and the like.

Figure 2:
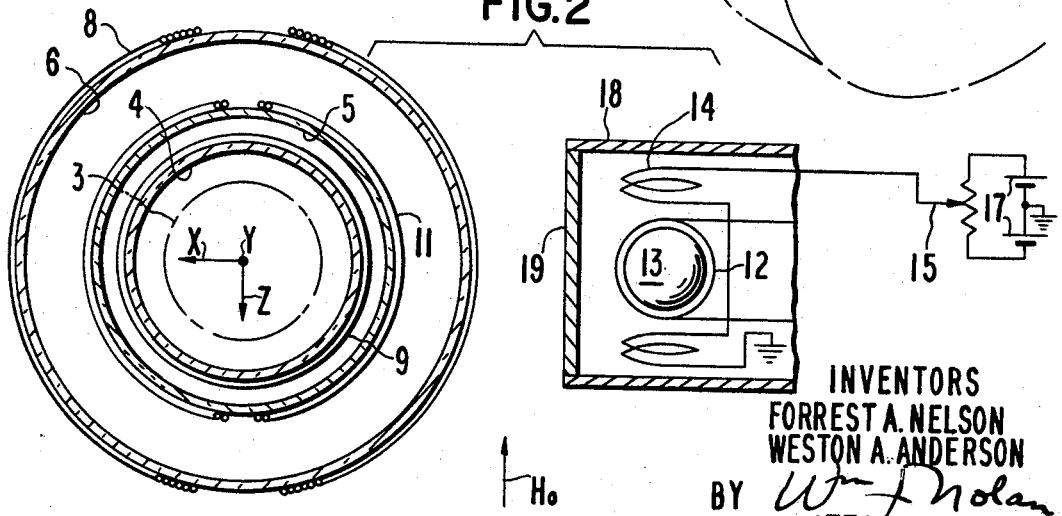
Figure 3:
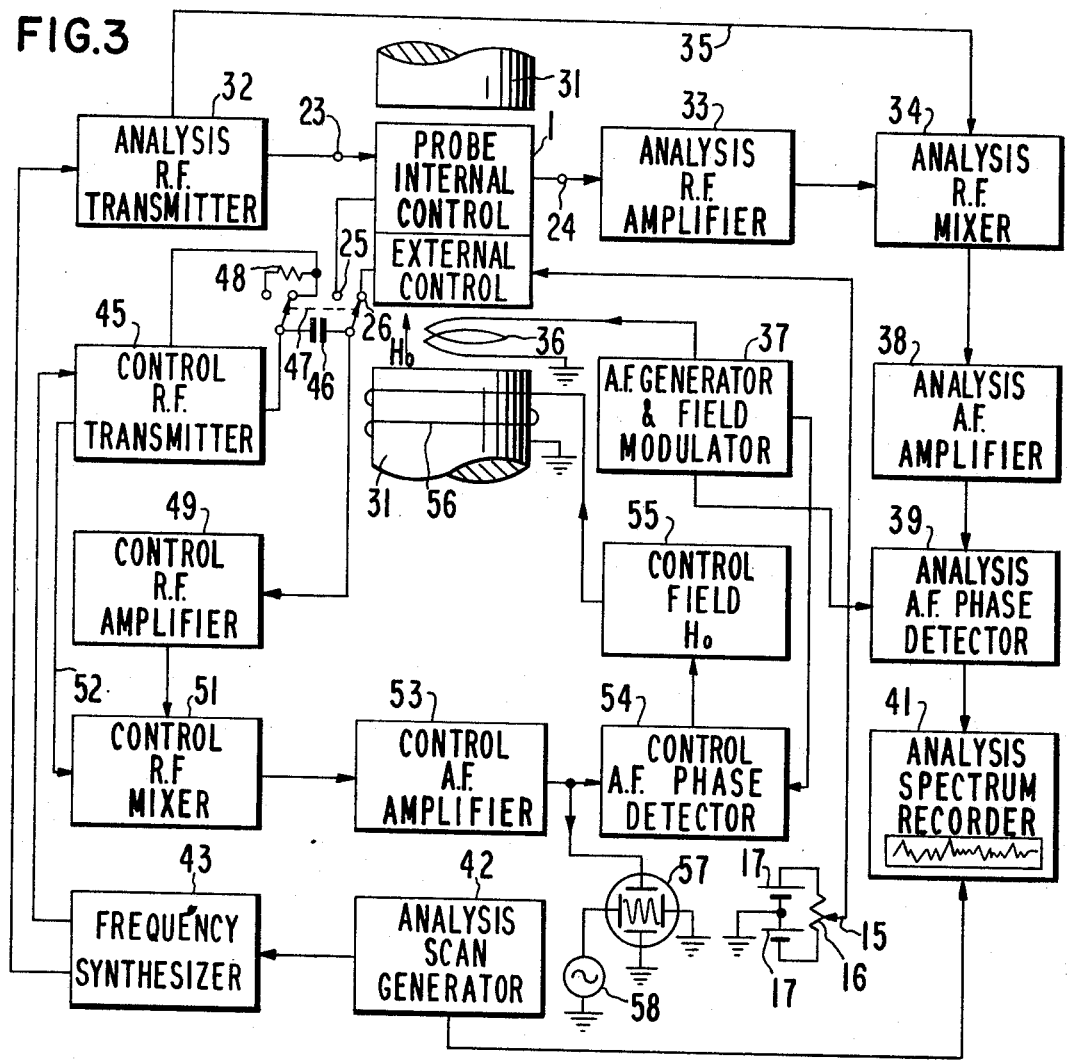
Figure 4:
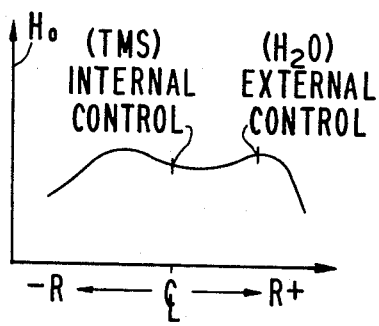
Figure 5:
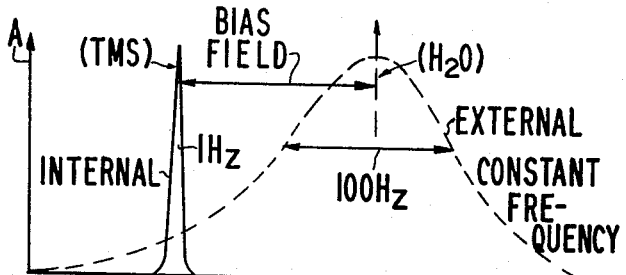

Other features and advantages of the present invention will become apparent upon a perusal of the following specification taken in connection with the accompanying drawings wherein:

FIG. 1 is a schematic perspective view of a probe structure for a gyromagnetic resonance spectrometer employing features of the present invention, FIG. 2 is a cross-sectional view, partly schematic, of the structure of FIG. 1 taken along line 2—2 in the direction of the arrows, FIG. 3 is a schematic block diagram of a spectrometer employing the features of the present invention, FIG. 4 is a plot of polarizing magnetic field intensity $H_0$ as a function of radius R along the X axis and away from the Z axis of the probe disposed in the gap of the magnet, and FIG. 5 is a plot of control group resonance signal amplitude A as a function of frequency for typical internal and external control groups.

Referring now to FIGS. 1 and 2, there is schematically shown a nuclear magnetic resonance probe 1 as modified for use in the spectrometer of the present invention. More particularly, the probe includes a hollow metallic block housing 2 as of aluminum containing a sample vial 3 surrounded by a plurality of nested coil forms 4, 5 and 6. A crossed coil structure of an analysis channel is formed by a transmitter coil 8 and receiver coil 9 carried upon coil forms 6 and 4, respectively. A single combined transmitter and receiver coil of single coil resonance control system is formed by coil 11 carried upon the intermediate coil form 5.

The three coils 8, 9, and 11 surrounding the sample vial 3 form the coil structure of a crossed coil analysis channel with an internal control channel. The internal control group such as the protons in tetramethylsilane (TMS) may be intermixed with the sample substance under analysis or the vial 3 may comprise concentric chambers, or an axial or transverse partition providing two chambers, one for the sample and one for the internal control group. Several different types of combined analysis and internal control channel probe structures are suitable. Several such suitable coil systems are described and claimed in copending application Ser. No. 527,152 filed Feb. 14, 1966 and Ser. No. 527,311 filed Feb. 14, 1966, both assigned to the same assignee as the present invention.

An external control coil structure is also provided in the probe 1. The external coil structure includes a single combined transmitter and receiver coil 12 wound around a smaller vial 13 containing the control group of gyromagnetic bodies such as the protons in a water sample. Also a D.C. magnetic field bias coil structure 14, shown only in FIG. 2, provides a variable local D.C. bias field over the external control group to provide means for changing the resonance conditions applied to the external control group relative to those conditions applied to the internal control group and sample under analysis. The field bias coil 14 preferably has the smallest dimensions, as of 0.25″ in diameter, consistent with reasonable D.C. field homogeneity over the external control group in order to prevent producing an excessive inhomogeneity over the internal control group and sample under analysis. A suitable geometry for the bias coil 14 a Helmholtz pair series-connected in magnetic field aiding relation straddling the control group with the axis of the coil 14 parallel to the direction of the polarizing magnetic field $H_0$. The bias coil 14 is connected to a pickoff 15 of a potentiometer 16 connected across a pair of grounded center-tapped batteries 17.

The coil structure of the external control channel is preferably radio frequency shielded from the crossed coil system of the analysis channel by enclosing the external control coil structure inside of a hollow conductive metallic tube 18 which is closed at its inner end by a transverse conductive wall 19. A probe containing an external control group as an integral part thereof is described and claimed in copending U.S. application Ser. No. 390,092 filed Aug. 17, 1964, now issued as U.S. Patent 3,284,700 on Nov. 8, 1966, and assigned to the same assignee as the present invention.

The R.F. coils 8, 9, 11 and 12 are all preferably tuned for resonance at the resonant frequencies of their respective gyromagnetic resonant bodies by means of variable capacitors 21 connected with fixed capacitor 22 across the terminals of the respective R.F. coils. The series branch connection of capacitors 21 and 22 forms an impedance match to their respective transmission lines which are connected to the resonant coils across fixed capacitors 22 to ground via terminals 23, 24, 25 and 26, respectively.

Referring now to FIG. 3, there is shown in block diagram form a gyromagnetic resonance spectrometer utilizing the features of the present invention. More specifically, the probe 1, having the internal and external control coil structures, is positioned in the gap of a powerful electromagnet 31 to immerse the sample under analysis and the internal and external control groups of gyromagnetic bodies in the polarizing magnetic field $H_0$.

An analysis channel is provided for detecting the gyromagnetic resonance spectrum of the sample under analysis. The analysis channel includes an analysis R.F. transmitter 32 for supplying an A.C. magnetic field $H_1$ to the transmitter coil 8 of the crossed coil system within the probe via terminal 23. The frequency of the analysis transmitter is scanned, in a manner more fully described below, through the various resonance frequencies of the gyromagnetic groups within the sample under analysis to excite resonance thereof. The resonance signals of the sample under analysis are picked up in receiver coil 9 and fed via terminal 24 to the input of an analysis R.F. amplifier 33 for amplification. The output of the R.F. amplifier is fed to one input terminal of an analysis R.F. mixer or detector 34 wherein the received resonance signal is mixed with the transmitted R.F. signal derived from the analysis transmitter 32 via lead 35 to produce an output difference signal at the field modulation frequency.

The spectrometer of FIG. 3 is a sideband spectrometer in that the frequency of the R.F. applied A.C. magnetic fields is not at the resonant frequency of the gyromagnetic bodies but is displaced therefrom by some convenient audio frequency such as, for example, 6 kHz. The magnetic field $H_0$ is modulated by the audio frequency corresponding to the displacement between the R.F. frequency and the resonance frequencies of the gyromagnetic bodies. In this manner the audio signal is combined with the R.F. signal in the non-linearity of the gyromagnetic bodies at their resonance frequencies to produce a sideband frequency which is at the resonance frequency of the gyromagnetic bodies to excite resonance thereof. This type of spectrometer has the advantage, as compared to a spectrometer where the R.F. transmitter and resonance R.F. receiver amplifier operate at the same frequency, in that by using the audio offset in the frequencies of these two devices undesired baseline drift is avoided.

In the spectrometer of FIG. 3, the D.C. polarizing field $H_0$ is modulated at the audio frequency by means of a coil 36 located in the gap of the magnet 31 and excited with audio frequency power derived from an audio frequency generator and field modulator 37 operating at a fixed frequency as, for example, 6 kHz.

The output of the analysis R.F. mixer 34 contains the audio frequency resonance signal which is fed to the analysis audio frequency amplifier 38 and thence to one input terminal of an analysis audio frequency phase detector 39. In the phase detector 39 the amplified audio frequency resonance signal is compared in phase with a sample of the audio frequency field modulation signal to produce a D.C. resonance signal of the sample under analysis which is fed to an analysis spectrum recorder 41. The resonance signal is recorded as a function of time or as a function of a scan signal derived from an analysis scan generator 42.

The analysis scan generator 42 scans the frequency of the analysis transmitter 32 by scanning the output frequency of a frequency synthesizer 43 used to control the frequency of the analysis R.F. transmitter 32. Thus, in the analysis channel the analysis scan generator 42 scans the frequency of the analysis R.F. transmitter 32 across the expected resonance frequencies of the gyromagnetic groups within the sample under analysis to produce a spectrum output signal which is recorded in the analysis spectrum recorder 41.

The spectrometer of FIG. 3 also includes a control channel for controlling the resonance conditions applied to the sample under analysis. The control channel includes the previously discussed internal and external control groups contained within the probe 1.

The control channel includes a control R.F. transmitter 45 for supplying an R.F. A.C. magnetic field displaced by the audio frequency of the audio frequency generator from the resonance frequency of the internal control group. The R.F. output of the control transmitter 45 is supplied to the input terminal 25 of the single coil internal transmitter-receiver coil 11 via the intermediary of an impedance isolating capacitor 46, switch 47, and attenuator 48. Capacitor 46 has an impedance which is high, at the operating frequency, compared to the parallel impedance of the tuned combined transmitter-receiver coil 11. Switch 47 is for switching both transmitter 45 and R.F. amplifier 49 between the internal control coil 11 and the external control coil 12. The attenuator 48 is for reducing the power level of the R.F. control transmitter signal as applied to the internal control group relative to the external control group.

A control R.F. amplifier 49 is also connected to switch 47 to receive resonance signals from either the internal or external groups as determined by the setting of switch 47. The control R.F. amplifier 49 serves to amplify R.F. resonance signals of the internal or external control groups picked up by the respective coils 11 or 12 to supply an amplified output signal to the signal input terminal of a control R.F. mixer or detector 51. The R.F. control resonance signal is mixed with the control R.F. transmitted signal as derived via lead 52 to produce an output audio frequency resonance signal which is supplied to a control audio frequency amplifier 53 and thence to a control audio frequency phase detector 54. In the phase detector the resonance audio phase is compared with the phase of the audio frequency signal applied for field modulation and derived from audio generator 37 to produce a dispersion mode D.C. resonance signal which is fed to a field controller 55.

The field controller 55 is a power amplifier and serves to provide its output error signal to a field corrective coil 56 for correcting the intensity of the polarizing field $H_0$ to sustain resonance of the control group and maintain a field value which is controlled by the frequency of the control R.F. transmitter 45 and audio frequency generator 37. The frequency of the control R.F. transmitter 45 is controlled by an output signal derived from the frequency synthesizer 43 and is typically not scanned in this arrangement but held at some predetermined fixed frequency.

A sample of the audio control resonance signal, obtained in the output of the control audio frequency amplifier, is fed to the vertical deflection plates of an oscilloscope 57 for displaying the audio frequency signal as a function of an internal reference signal of the oscilloscope derived from its internal oscillator 58. In this manner, resonance of the control group may be readily ascertained by observation of the trace on the oscilloscope 57. In the absence of a signal on the oscilloscope it is readily ascertained that resonance of the selected control group is not being obtained. As an alternative, the control resonance signal could be monitored by disconnecting the oscilloscope's internal generator 58 and applying instead a sample of the field modulation signal from audio frequency generator 37 to the horizontal deflection plates of the oscilloscope 57. The control group magnetic field bias circuit 14–17, as previously described in FIG. 2, feeds its input signal into the external control section of the probe 1.

Referring now to FIGS. 3–5, the operation of the combined internal and external control circuits will be more fully described. Typically, the internal control group will comprise a very narrow strong resonance line such as that obtained from the protons of tetramethylsilane (TMS) to produce a strong gyromagnetic resonance line at approximately 60 mHz. in a magnetic polarizing field having an intensity $H_0$ of approximately 14 kg. A water sample is typically utilized as the external control group and such sample, because of its disposition in a relatively inhomogeneous region of the polarizing magnetic field as compared to the very homogeneous field region over the sample under analysis, will have a resonance line width on the order of 100 Hz. The magnetic field intensity $H_0$ at the positioin of the external control group is quite likely not the same as at the site of the internal control group. Moreover, there may be some chemical shifting of the resonance line of the internal control group relative to the external group such that their respective resonance lines will not be centered at precisely the same frequencies as shown in FIG. 5.

If this is the case, then switching the switch 47 between internal and external control groups will produce a shift in the polarizing magnetic field $H_0$ due to the error signal produced in the control channel. This, of course, assumes that the resonance frequency of the internal control group is sufficiently close to the resonance frequency of the external control group such that the control channel will pull into a lock on the line to which it is switched. In switching from the narrow internal line to the external line, if there is a substantial overlapping of the lines as indicated in FIG. 5, then the control channel will pull into a lock at the center of the water line. However, in a shift from control on the external water line back to the narrow internal line, the system will not pull into a lock because in order to pull into a lock there must be a substantial amount of resonance signal present at the frequency of the control transmitter.

When using a very narrow internal line, as desired for proper calibration of the spectra, and when switching from a broad external line to a weak narrow internal line, the narrow internal line will not pull the control channel into a lock unless the resonance frequency of the control channel is within one or two Hz of the resonance frequency of the internal control group.

Thus, in operation, it is highly desirable that the external control group provide a relatively broad resonance line such that its resonance frequency can more easily be found and the control system locked thereto. Then by rapidly switching back and forth between the external and the internal control groups via switch 47 and observing the presence or absence of a resonance signal on the oscilloscope 57 for the internal group while varying the field bias to move the external line into frequency coincidence with the internal line, the operator is able to quickly search out and find the internal resonance line.

When the internal resonance line is found, the bias field will have been adjusted such that the resonance frequency of the internal line is substantially in coincidence with the resonance frequency of the external group such that the switch 47 may be switched back and forth between internal and external control without loss of lock on the control channel. When this condition is satisfied, the internal control group may be removed at will and reinserted, as occasioned by changing the sample, and the operator need only switch from the internal to the external control to maintain control of the spectrometer. In this manner, when samples are changed, a time-consuming and tedious search for the internal resonance line is avoided.

Although a D.C. field bias applied to the external group was shown for bringing the resonance frequencies of the internal and external groups into coincidence, other bias arrangements may be used; for example, the D.C. field could be varied over both groups or only over the internal group. Also, different variable frequency field modulation outputs could be used over the two groups. Also, frequency scan of the analysis channel may be obtained by scanning the field modulation applied to the control channel relative to the field modulation applied to the analysis channel or vice versa.

As mentioned above, there are a number of different coil and probe constructions that will permit use of an internal control group. Furthermore, there are a number of different coil and probe structures for the external control groups. The present invention is applicable to these various different geometries and combinations. There need only be provided means for shifting control, as desired, from the internal group to the external group to prevent loss of control over resonance conditions of the system when removing the internal control group. Several different coil and probe constructions for internal control are described and claimed in the aforementioned copending U.S. applications 527,152 and 527,311.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyromagnetic resonance spectrometer including, means for simultaneously immersing a sample group under analysis, an internal control group and an external control group, in a D.C. polarizing magnetic field, means for exciting and detecting gyromagnetic resonance of the sample group and a selected one of the control groups, means forming a control channel responsive to the detected resonance of the selected control group for automatically controlling the resonance conditions over the sample group under analysis to prevent undesired drift effects, whereby maintenance of automatic control of the resonance conditions over the sample group on switching from external to internal control of the spectrometer as occasioned by withdrawal and subsequent insertion of the internal control group into the magnetic field is facilitated.

2. A gyromagnetic resonance spectrometer according to claim 1 including means for changing the resonance conditions over one control group relative to those existing over the other control group, and means for detecting a difference in the resonance, if any, of one control group relative to the other whereby resonance of the internal control group and resonance of the external control group may be brought into coincidence by changing the relative resonance conditions to further facilitate maintaining automatic control of the resonance conditions over the sample group on switching from external to internal control of the spectrometer as occasioned by withdrawal and subsequent insertion of the internal control group into the magnetic field.

3. The apparatus according to claim 2 wherein said means for changing the resonance conditions over one control group relative to the other includes, a magnetic field bias means adjacent one of the control groups for changing the magnitude of the polarizing field over one control group relative to the polarizing magnetic field over the other.

4. The apparatus according to claim 2 wherein said means for detecting the difference in resonance of one control group relative to the other includes, means for observing the change in control group resonance detected upon switching selection of the control group from one control group to the other.

5. The apparatus according to claim 4 wherein said observing means for observing the change in resonance between one control group and the other includes an oscilloscope.

6. The apparatus according to claim 3 wherein said magnetic field bias means is disposed adjacent said external control group whereby its effect on homogeneity of the polarizing field over the sample group under analysis is minimized.

7. The apparatus according to claim 2 wherein the resonance conditions over the external control group are selected such as to provide a substantially broader resonance line width for the external control group than for the internal control group, whereby the initial search for the resonance conditions to produce the external control resonance line is facilitated compared to the search for the narrower internal control resonance line.

8. The apparatus according to claim 2 wherein said means for exciting and detecting resonance of the control group and for controlling the resonance conditions in response to resonance of the selected control group includes a common control channel and means for selectively switching said common control channel between alternate ones of the control groups whereby the spectrometer circuitry is simplified.

9. The apparatus according to claim 2 wherein said means for exciting and detecting resonance of the sample group and one of the control groups includes an audio frequency polarizing magnetic field modulator for producing sideband resonance of the excited control group, and wherein said means for detecting a difference in resonance of one control group relative to the other includes means for sampling and responding to resonance signals in the control channel.

10. The apparatus according to claim 9 wherein said sampling and responding means includes an oscilloscope for displaying resonance signals, if any.

References Cited

UNITED STATES PATENTS

| | | | |
|---|---|---|---|
| 3,085,195 | 4/1963 | Anderson | 324—0.5 |
| 3,109,138 | 10/1963 | Varian | 324—0.5 |
| 3,329,890 | 7/1967 | Kingston | 324—0.5 |

RUDOLPH V. ROLINEC, *Primary Examiner.*

M. J. LYNCH, *Assistant Examiner.*